E. W. WOOLLEY.
CLUTCH AND REGULATING MECHANISM.
APPLICATION FILED NOV. 13, 1909.
1,157,275.
Patented Oct. 19, 1915.
5 SHEETS—SHEET 1.
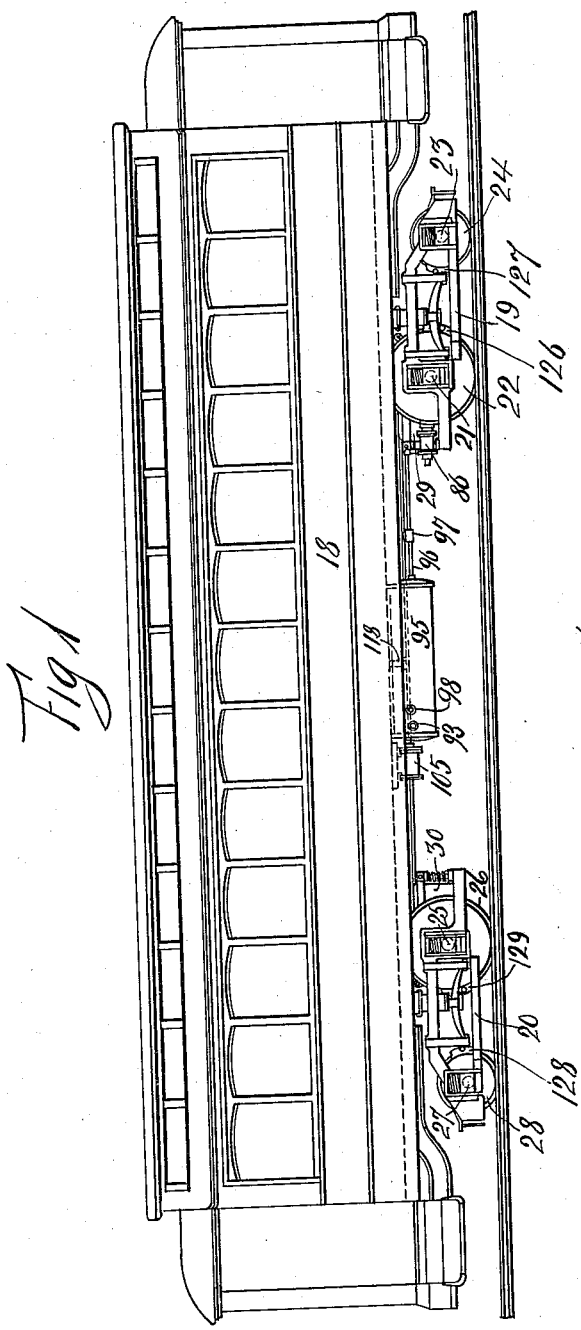
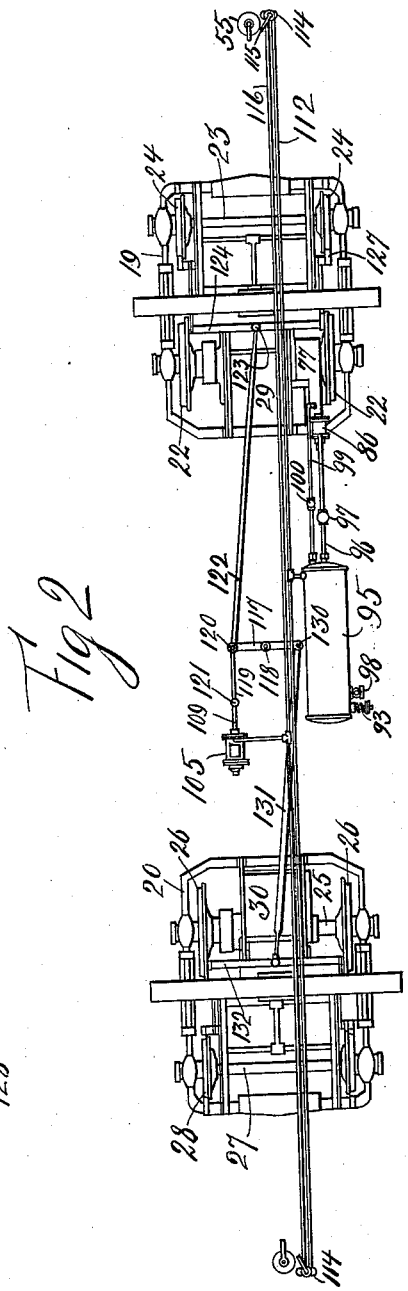
Witnesses
Martin Zimansky
John J. Millin
Inventor
Edward W. Woolley
By his Attorney
N. A. de Bonneville E. W. WOOLLEY.
CLUTCH AND REGULATING MECHANISM.
APPLICATION FILED NOV. 13, 1909.
1,157,275.
Patented Oct. 19, 1915.
5 SHEETS—SHEET 2.
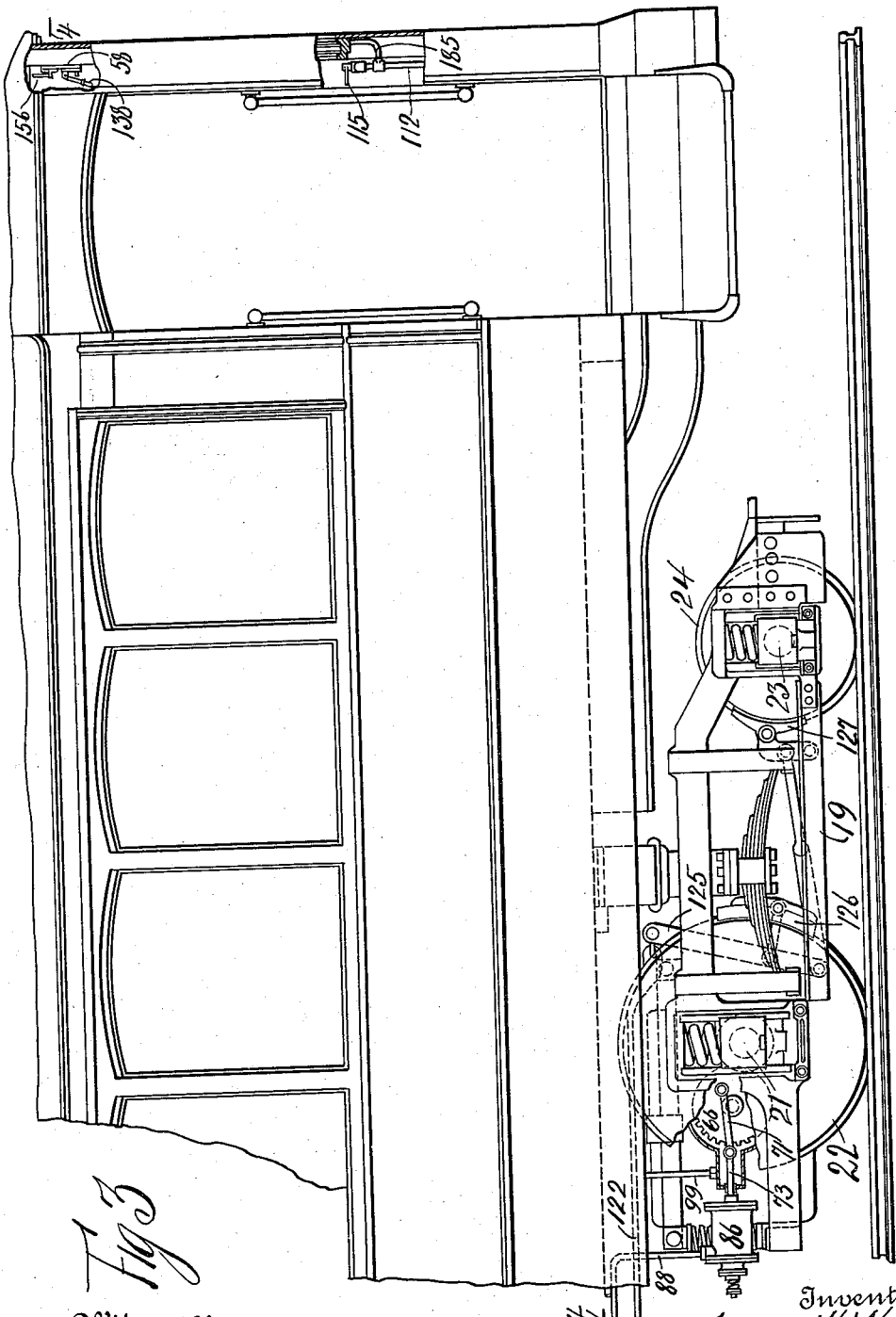

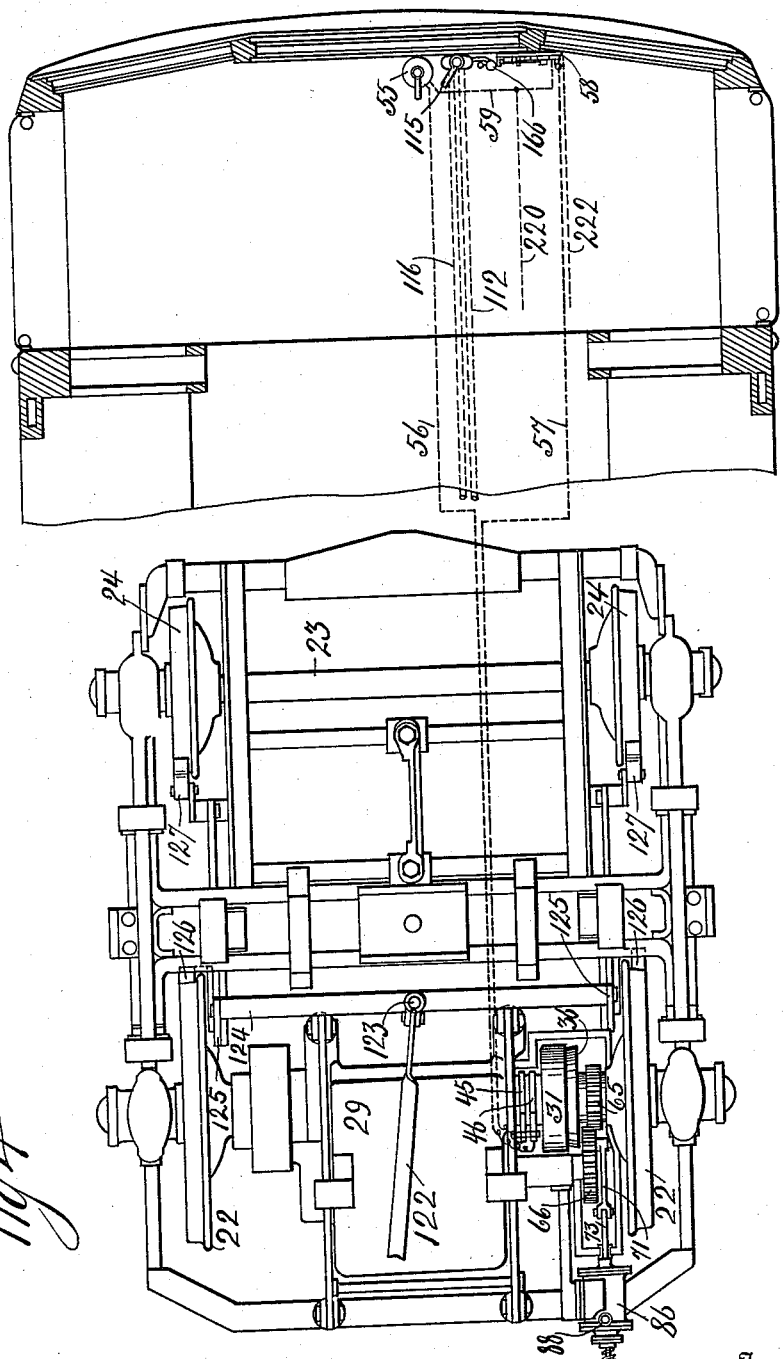

E. W. WOOLLEY.
CLUTCH AND REGULATING MECHANISM.
APPLICATION FILED NOV. 13, 1909.
1,157,275.
Patented Oct. 19, 1915.
5 SHEETS—SHEET 4.
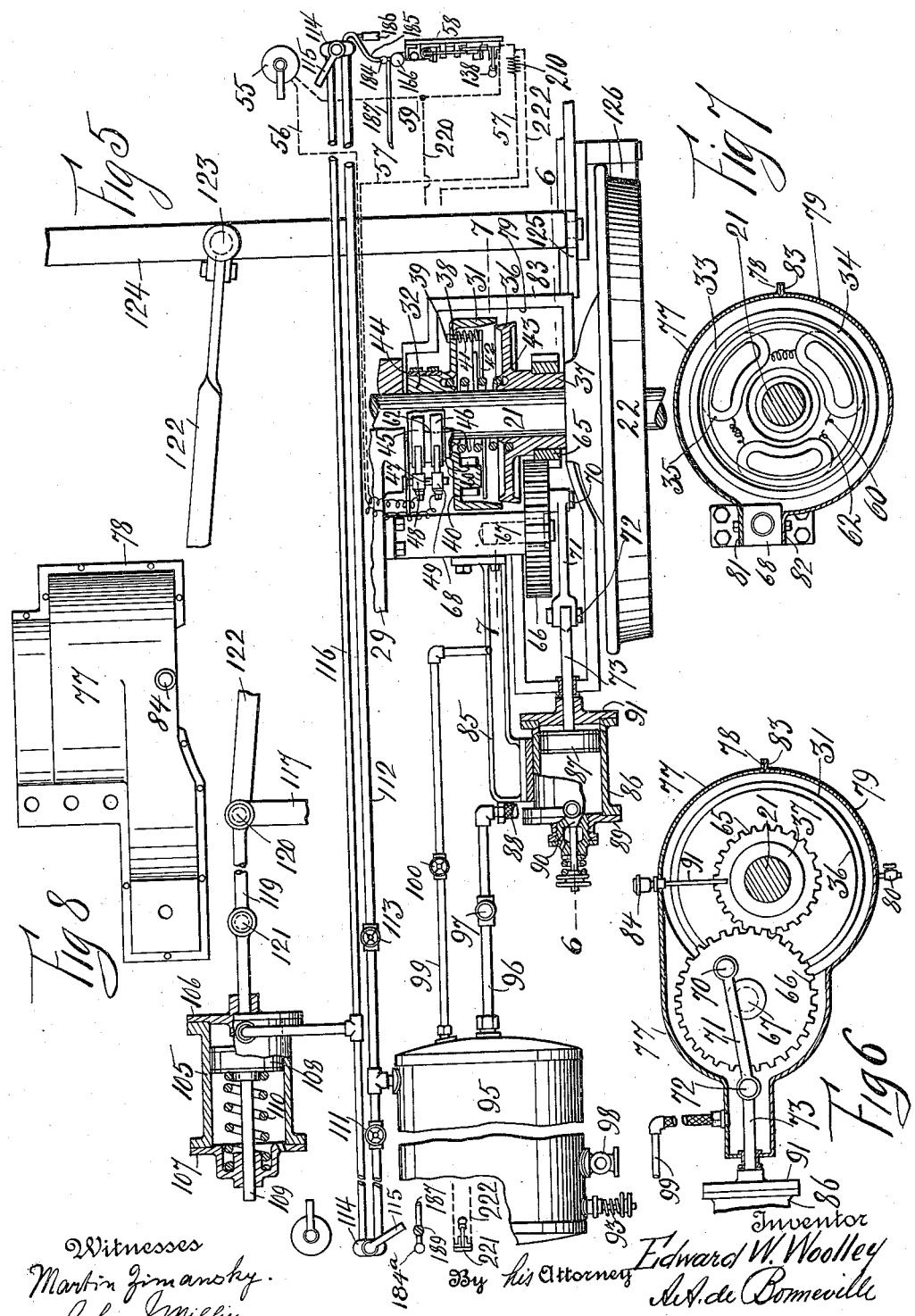
Witnesses
Martin Zimansky
John J. Millin
Inventor
Edward W. Woolley
By his Attorney
A. A. de Bonneville

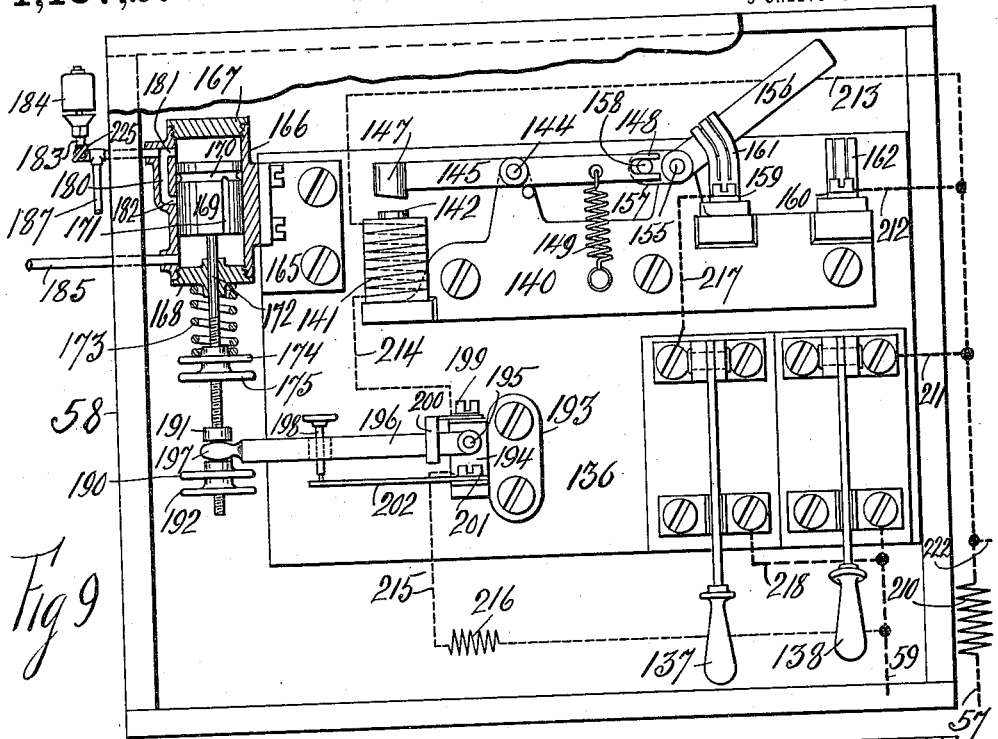

UNITED STATES PATENT OFFICE.

EDWARD W. WOOLLEY, OF JERSEY CITY, NEW JERSEY.

CLUTCH AND REGULATING MECHANISM.

1,157,275.  Specification of Letters Patent. Patented Oct. 19, 1915.

Application filed November 13, 1909. Serial No. 527,847.

*To all whom it may concern:*

Be it known that I, EDWARD W. WOOLLEY, a citizen of the United States, and a resident of Jersey City, in the county of Hudson and State of New Jersey, have invented certain new and useful Improvements in Clutch and Regulating Mechanism, of which the following is a specification.

This invention relates to a clutch and regulating mechanism.

It is specially applicable to vehicles, electric trolley cars and the like, but the elements of the invention are useful for various other purposes. Its organization comprises essentially a reservoir that is charged with compressed air by a compressor which latter is driven by an electrically controlled clutch. The clutch is controlled by an electric switch, which is controlled by a regulating and signal cylinder, and the latter is controlled by the pressure of the air in the reservoir. The operating elements are thus interdependent of one another and provide means for the proper predetermined pressures in the reservoir, operating when said pressure falls too low and stopping when the required pressure has been obtained. The regulating and signal cylinder blows a whistle when either limit of pressure is reached, apprising the operator of the limiting pressures of the invention.

Figure 1 represents a side view of a car with the invention connected thereto, Fig. 2 shows a top plan view of the trucks of the car with some of the appurtenances of the invention, Fig. 3 shows an enlarged fragmentary portion of Fig. 1, Fig. 4 shows a top plan view of the truck with its appurtenances as shown in Fig. 3 with a section of said Fig. 3 on the line 4, 4, Fig. 5 shows an enlarged plan view partly in section of the elements of the invention, Fig. 6 represents a section of Fig. 5 on the line 6, 6 Fig. 7 is a section of Fig. 5 on the line 7, 7, Fig. 8 shows a top plan view of a casing, Fig. 9 represents an enlarged front view of the switch box with its appurtenances, Fig. 10 shows a top plan view of Fig. 9 with the box in section, and Fig. 11 represents a vertical section of the threeway cock and a view of its immediate connections.

A car is represented with the body 18 to which are pivoted in the usual way a pair of trucks 19 and 20. The truck 19 has connected up therewith the main driving axle 21 with the truck wheels 22, and the secondary axle 23 with the truck wheels 24. The truck 20 has the driving axle 25 with the truck wheels 26, and the secondary axle 27 with the truck wheels 28. The driving axle 21 has connected up therewith the driving motor 29 and the driving axle 25 has connected up therewith the driving motor 30. On the said axle 21 is fastened one of the members of a friction clutch, and in this instance the female member 31 having the hub 32. The said member 31 is composed of an upper portion 33 and a lower portion 34 secured to each other by screws not shown, so that the said portions can be clamped on the axle 21. The said female member carries the three electromagnets having the spools 35. A male member 36 of the said clutch having the hub 37 is slidably supported on the said axle 21 to register with the female member of the clutch, and is also preferably made of two portions.

Three plungers 38 with the collars 39 are supported in openings formed in the rear wall 40 of the female member 31 of the clutch. Each plunger supports a spring 41, which latter are capped by the ring cap 42. A central spring 43 may encircle the driving axle 21 and bear between the members of the clutch. Around the hub 32 of the female member 31 of the clutch is secured an insulated sleeve 44, which supports the metallic contact rings 45 and 46. A pin 47 extends from the housing of the motor 29 and supports the brush holders 48, 49 having brushes that bear respectively on the contact rings 45 and 46. A starting box 55 is represented with the wire 56 that conducts electric current to the brush holder 49 and its brush. A feed wire 57 extends from the brush holder 48 to the switch box 58 to be described, and from the latter a feed wire 59 leads to the said starting box 55. A wire 60 leads from the ring 46 to the spools 35 of the electromagnets, and a wire 62 connects said spools with the ring 45. When the electromagnet is excited it attracts the male member 36 of the clutch, which latter therefore constitutes the armature of said magnet. On the hub 37 of the male member of the clutch is secured the pinion 65, the teeth of which mesh with the teeth of the spur gear 66 journaled on the pin 67 secured in the bracket 68. The latter is bolted to the housing of the motor 29. A crank pin 70 extends from the outer face of the spur gear 66 and supports one end of the connecting rod 71, the other end of which is pinned by means of the pin 72 to the piston rod 73. A dust cover comprising the upper portion 77 with the flange 78 and the lower portion 79 with the flange 83 and the valve 80, incloses the clutch with its appurtenances as shown. A leg 81 of the portion 77 is bolted to the upper face of the bracket 68 and a leg 82 of the lower portion 79 is bolted to the lower face of the said bracket 68. An oil cup 84 with the tube 91 is carried on the portion 77 to lubricate the boss 37 of the clutch.

From the bracket 68 extends the bracket 85, and the latter supports the compressor 86 having the piston 87. The piston rod 73 is connected to the said piston 87 and flexible discharge tubing 88 is connected to the said compressor. The cylinder head 89 of the compressor carries the inlet valve 90, and the cylinder head 91 supports the piston rod 73 of said compressor.

To the body 18 of the car is fastened a reservoir 95 which has extending therefrom the piping 96 with the check valve 97, and the said piping is connected to the tubing 88 leading from the compressor 86. A safety valve 93 is fitted to the reservoir 95 and a valve connection 98 on said reservoir allows it to be charged with compressed air by independent means. Piping 99 with the valve 100 connects the said reservoir with the upper portion 77 of the dust cover, the said piping coacting with the valve 80 on the lower portion 79 of said dust cover. The office of the piping 99 is to spray the elements within the dust cover with air, to clean them from any dust that may collect therein. A brake cylinder 105 is also fastened to the body 18 of the car, and is represented with the heads 106 and 107. A piston 108 in said cylinder has extending therefrom the piston rod 109 and a spring 110 encircling said rod bears between the inner face of the bonnet 107 and the piston 108, the piston rod extending through both bonnets of the brake cylinder.

Piping 112 with the valves 111 and 113 extends from the reservoir 95 to three way cocks 114 having the handles 115. Piping 116 connects the said three-way cocks 114 with the brake cylinder 105, the inlet for the latter being located adjacent to the bonnet 106.

A center brake lever 17 is fulcrumed on a pin 118 extending from the body of the car, and one end of a link 119 is pinned with a pin 120 to one arm of said lever. The other end of the link 119 is pinned by means of the pin 121 to the piston rod 109. The pin 120 also supports one end of the link 122 the other end of which is pinned by means of the pin 123 to the brake beam 124. Levers 125 are pivoted to the beam 124 and the latter are connected up with the brakes 126, 127 of the truck 19 in the usual way. The center brake lever 117 also carries the pin 130 to which is pinned one end of the rod 131, the other end of which latter is pinned to the brake beam 132. The beam 132 is connected up with the brakes of the truck 20 in a manner similar to the connections of the brake beam 124 with the brakes 128 and 129. The switch boxes 58 are preferably located at the ends of the car adjacent to the roof thereof, within reach of the motorman. On the supporting plate 136 within each of said boxes is located a main switch with the handle 137 and an operating switch with the handle 138. An automatic switch with the frame 140 is fastened to the supporting plate 136. A magnet 141 with the core 142 is connected up with the frame 140. A boss 143 with the fulcrum pin 144 extends from the frame 140 and supports the lever 145, which has formed therewith at one end the armature 147 for the magnet 141, and at the other end the fork 148. A spring 149 extends from the lever 145, between the pin 144 and fork 148, to the frame 140. A pivot 155 on the frame 140 carries the knife blade 156 having formed therewith the arm 157 that has extending therefrom the pin 158 which registers with the fork 148. Binding posts 159 and 160 are insulated from and carried on the frame 140. A pair of contact springs 161 are connected up with the post 159 and a pair of contact springs 162 are connected up with the post 160, the springs 161 being continuously in register with the blade 156 and the latter being in and out of contact with the contact springs 162, dependent upon the location of said blade 156.

A bracket 165 is fastened to the supporting plate 136 and carries a regulating and signal cylinder 166 having the cylinder heads 167 and 168. A piston 169 in the cylinder has formed therewith the circumferential port 170 on the surface thereof, and the vertical port 171 which connects therewith and extends to the lower face of the said piston. A piston rod 172 extends from the piston 169 through the cylinder head 168, and around which is located the spring 173. A pair of knurled nuts 174 and 175 are in threaded engagement with the piston rod 172 and the spring 173 bears between the cylinder head 168 and the nut 174. In the wall of the cylinder 166 is formed a vertical port 180 with the branches 181 and 182, that can register with the circumferential port 170. The vertical port 180 is connected with the piping 183 having the valve 225 and leads to the whistle 184. A branch pipe 185 connects the lower end of the cylinder 166 with the piping 112 below the three-way cock 114, and has connected thereto a pressure gage 186. Piping 187 with the valve 189 leads from the piping 183 to a second whistle 184ª similar to the whistle 184 and located at the other end of the car.

A knurled nut 190 with the grooved sleeve 191 and the knurled nut 192, are both in threaded engagement with the piston rod 172. A bracket 193 fastened to the plate 136 has extending therefrom a lug 194. A pivot 195 is supported on the lug 194 and on which is pivoted a contact lever 196. The said lever has a forked end 197 which registers with the groove of the sleeve 191, and carries in threaded engagement the contact screw 198. A binding post 199 and contact spring 200 are connected up with the lug 194, and said spring bears on the lever 196. A second binding post 201 on the lug 194 has connected up therewith the flexible bar 202. A resistance coil 210 is in the line of the feed wire 57, and said wire is connected to the operating switch having the handle 138, by means of the branch wire 211, to the binding post 160 by means of the branch wire 212 and to the magnet 141 by means of the branch wire 213. A wire 214 connects the magnet 141 with the binding post 199 of the lug 194, and a wire 215 having the resistance coil 216 connects the binding post 201 of the lug 194 with the other feed wire 59. A wire 217 connects the binding post 159 with the main switch having the handle 137, and a wire 218 connects the latter switch with the feed wire 59.

A wire 220 extends from the feed wire 59 and leads to the switch 221, that is similar to the switch having the handle 138, and a wire 222 connects said switch 221 with the wire 57.

To use the invention and should there be no charge of compressed air in the reservoir 95, and supposing the regulating cylinder 166 inoperative, the motorman being at end of car adjacent to switch box 58 opens the switch having the handle 137, the switch 221 being open and closes the operating switch having the handle 138. Electric current then flows from the starting box 55 through the feed wire 59 to said switch with the handle 138, and through the branch wire 211 into the feed wire 57, which conducts the current to the contact ring 45. From the latter the current flows through the wire 62 and then into the coils of the spools. The wire 60 conducts the current to the contact ring 46, and from the latter the current is conducted by means of the wire 56 back to the starting box 55. The magnets are excited by the said current and the male member 36 of the clutch is attracted toward the female member 31 thereof, closing said members. With the closing of the members of the clutch, the rotation of the axle 21 is transmitted to the gear 66 by the pinion 65. The piston 87 in the compressor 86 is caused to reciprocate when the spur gear 66 rotates, and air is drawn into said compressor 86 through the inlet valve 90 and forced through the flexible tubing 88 and piping 96 into the reservoir 95 until the requisite pressure is obtained. After the pressure has reached its maximum point the operator opens the switch having the handle 138 which opens the circuit of the feed wires 57 and 59 and no current enters the spools 35 of the magnets in the female member 31 of the clutch. The springs 41, 43 therein disengage the members of the clutch which stops the reciprocations of the piston 87 of the compressor 86. The springs 41 and 43 bear between the members of the clutch and tend to separate them.

In case the automatic appurtenances of the invention are in proper operative adjustment the switch 221 and the switch with the handle 138 are kept open, and the switch with the handle 137 is closed. Current from the wire 59 then flows through the wire 218, through the switch having the handle 137, and from the latter switch current flows through the wire 217 to the binding post 159. Under the supposition that there is no pressure in the reservoir 95 the piston 169 in the regulating cylinder 166 is at the lower end of its stroke, by virtue of which the contact lever 196 moves the contact screw 198 to bear against the flexible bar 202. Current will then flow through the wires 214 and 215 to excite the magnet 141. The said magnet 141 attracts the armature 147 which causes the knife blade 156 to register with the contact springs 162 and current flows through the branch wire 212, and from thence through the wire 57 and the spools 35 of the female member are electrically excited which causes the members of the clutch to engage. While the piston 169 is in its lower position, air escapes through the vertical port 171 and the circumferential port 170, and from the latter into the port 180. The air from the latter enters the piping 183 and blows the whistle 184, to notify the motorman that the pressure in the reservoir is below the normal predetermined amount. The escape of air through the ports 170, 171 and 181 assists the descent of the piston 169 and lever 196. The members of the clutch being engaged, the compressor 86 forces compressed air into the reservoir. The spring 173 controls the amount of pressure required to force the piston 169 upwardly, and if above the predetermined normal amount, it rises until a circumferential port 170 registers with the branch port 181, and air is again forced into the piping 183 and the whistle 184 blown. As soon as the piston has reached its top or upper position, the contact screw 198 disengages from the bar 202, which breaks the electric circuit of the magnet 141, and the tension of the spring 149 pulls down the end of the lever 145 having the fork 148. This causes the blade 156 to disengage from the contact springs 162. The latter position of the said blade breaks the circuit of the feed wires 57 and 59. The spools of the magnets not now being excited the springs 41, 43 force the male member 36 from the female member of the clutch, and the reciprocations of the piston 87 in the compressor 86 are stopped.

It will be noted that the magnet 141 and the spring 149, cause the knife blade 156 to be respectively quickly detached and quickly engaged with the contact springs 162, preventing arcing between said blade and said contact springs 162, and the structure produces a snap switch.

The lever 196 and bar 202 perform the functions of a circuit breaker and closer.

In case the motorman is at the end of the car distant from the switch box 58, the switch 221 is used in place of the switch having the handle 138, to operate the electrically controlled clutch by hand, and in which case the switch with the handle 138 is kept open.

Having described my invention what I desire to secure by Letters Patent and claim is:

1. In a vehicle the combination of a rotating element, a clutch connected up with said element, an electromagnet connected up with the clutch coacting between the members thereof, a compressor coacting with the clutch, the said magnet controlled by the pressure of the fluid produced by the compressor, a regulating cylinder coacting with the pressure of the fluid, a piston in the cylinder, said piston and cylinder having means to allow the escape of some of said fluid at the downstroke of the piston and means in the regulating cylinder to perform another function.

2. The combination of a compressor to compress a fluid, a rotating element, a clutch connected up with said element, connections between the clutch and compressor to operate the latter and electric means to control one of the members of said clutch by the pressure of said fluid, a regulating cylinder coacting with said pressure, said piston and cylinder having means to allow the escape of fluid therefrom and means in the regulating cylinder to perform another function.

3. The combination of a compressor to compress a fluid, an adjustable clutch connected up with said compressor, electric means controlling a movable member of said clutch, said electric means controlled by the pressure of said fluid, a regulating cylinder coacting with said fluid having means to allow the escape of some of the fluid from the cylinder and means in the regulating cylinder to blow a signal.

4. The combination of a rotative element, one member of a clutch fastened to said element, a second member of the clutch slidably connected to the rotative element, a compressor connected up with said second member of the clutch, electric means to move said slidable member, means to control the said electric means by the pressure of the fluid produced by the compressor, a regulating cylinder coacting with said fluid, a piston for the cylinder, the said piston and cylinder having means to enhance the descent of the piston in the cylinder and means in the regulating cylinder to blow a whistle.

5. The combination of a rotative element, one member of a clutch fastened to said element, a movable member for said clutch, a compressor connected with the movable member to compress a fluid, an electromagnet connected with the first member of the clutch, a pair of electric feed wires for the magnet, an electric switch connected up with the feed wires, a regulating cylinder to open and close said switch, the operations of said cylinder controlled by the pressure of the fluid, a piston for the cylinder, the said piston and cylinder having means to enhance the descent of the piston and means in the regulating cylinder to operate a signal.

6. In a vehicle the combination of a reservoir, a rotative element in the vehicle, an electrically operated clutch connected to the rotative element, a compressor between the clutch and reservoir to charge the latter with compressed air, a regulating cylinder connected with the reservoir, a piston for the cylinder, said cylinder and piston having means to assure the descent of the piston in the cylinder, and a snap switch interposed between the regulating cylinder and the electrically operated clutch and means in the regulating cylinder to operate a signal.

7. In a vehicle the combination of a reservoir, a rotative element in the vehicle, an electrically operated clutch connected up with the rotative element, a compressor between the clutch and the reservoir to charge the latter with compressed air, a regulating cylinder connected with the reservoir, a piston in the cylinder, said piston and cylinder having means to assure the descent of the piston in the cylinder, a circuit breaker and closer and a snap switch interposed between the regulating cylinder and the electrically operated clutch and means in the regulating cylinder to blow a whistle.

Signed at Jersey City in the county of Hudson and State of New Jersey this 9th day of November A. D. 1909.

EDWARD W. WOOLLEY.

Witnesses:
JAMES E. WOOLLEY,
A. A. DE BONNEVILLE.